June 10, 1958  J. T. GRAHAM, SR  2,837,861
OUTDOOR INSECTICIDE CONTAINER
Filed July 24, 1957
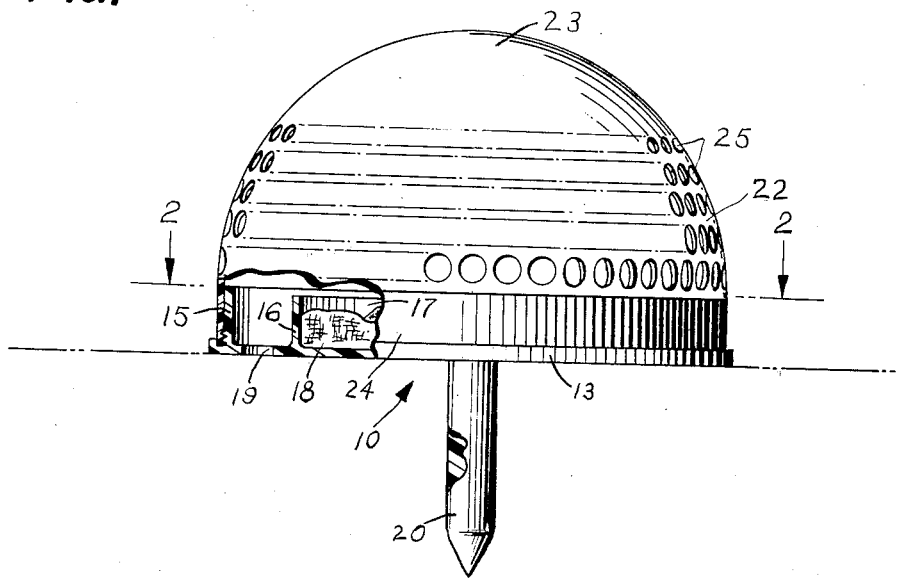
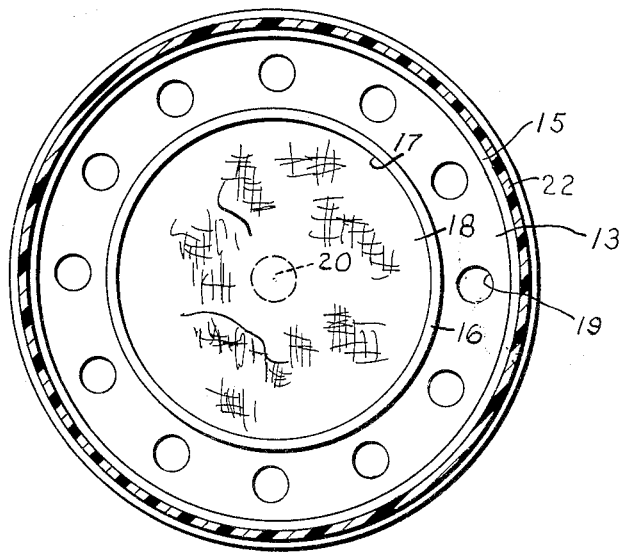
INVENTOR.
JAMES T. GRAHAM SR.

United States Patent Office 2,837,861
Patented June 10, 1958

2,837,861

OUTDOOR INSECTICIDE CONTAINER

James T. Graham, Sr., Piedmont, Ala.

Application July 24, 1957, Serial No. 673,969

2 Claims. (Cl. 43—131)

This invention relates to insect exterminators and more particularly to a device for exterminating ants, and the like.

It is an object of the present invention to provide an outdoor ant exterminator which may be placed in the exact location desired and which is completely safe for pets, poultry, and children.

Another object of the present invention is to provide an ant exterminator that is adapted to be used on lawns, around shrubbery and flowers, and at any place where ants enter a house, the device being adapted to use either liquid or paste types of insecticides.

Other objects of the invention are to provide an outdoor insecticide container bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view, with parts broken away, of a device made in accordance with the present invention; and Figure 2 is a transverse cross sectional view taken along line 2—2 of Figure 1.

Referring now more in detail to the drawing, an outdoor insecticide container 10 made in accordance with the present invention is shown to include a base member in the form of a bottom plate 13 having spaced concentric outer and inner walls 15, 16, respectively.

The inner one of the walls 16 defines a compartment 17 within which the insecticide 18 may be placed either in liquid or paste form. If used in a liquid form, a fabric pad or blotter is preferably used to prevent spilling thereof during installation and use. The bottom plate 13, between the inner and outer walls is provided with a plurality of perforations 19 which permit the space to be completely drained of rain and other liquid so as not to present a barrier to the passage of ants from the exterior of the device to the insecticide. A downwardly depending peg 20 provides securement means for mounting the base member in any desired location.

A hollow hemispherical cover member 22 is provided with an imperforate dome 23 and a perforated main body portion having perforations 25 of varying diameter, increasing in size from the top downwardly to the bottom rows. A substantially flat circular band 24 of the cover member 22 is provided with threads for threadingly engaging with mating threads carried upon the exterior surface of the outer wall 15 of the base member so as to releasably secure the cover member 22 and the base member together, as shown in Figure 1. This flat circular band 24 also provides a convenient location for imprinting the name of the device, the patent numbers, and other desired information.

In use, the compartment 17 is filled with the desired insecticide and the cover member 22 assembled with the base member and the entire unit secured in the ground at any desired location. The perforations 25 in the cover member are large enough to permit the entry of ants into the interior thereof, but are small enough to prevent any pets or children from gaining access to the poisonous insecticide. This device may be constructed of any desired plastic or similar material, and may be made in various attractive colors so that they will blend in with the surroundings within which they are placed.

While various changes may be made in the detail construction, it shall be understood that such changes shall be within the spirit and scope of the present invention as defined by the appended claims.

What I claim as new and desire to protect by Letters Patent of the United States is:

1. An outdoor insecticide container comprising, in combination, a base member having a compartment for receiving a quantity of insecticide, means for securing said base member in the earth, and a closure member enclosing said compartment and having means for limiting access to said compartment to small insects, said base member comprising a flat base plate, inner and outer spaced concentric circular walls extending upwardly from said base plate, said inner wall defining said compartment for receiving said insecticide, and said outer wall threadingly engaging said closure member, said base plate intermediate said inner and outer walls defining a plurality of drain openings, said closure member defining a hemispherical member having an upper imperforate portion, and said access means comprising perforations adjacent to the bottom of said hemispherical member.

2. The combination according to claim 1 wherein said securing means comprises an outwardly extending ground engaging peg.

References Cited in the file of this patent

UNITED STATES PATENTS

| | | |
|---|---|---|
| 395,542 | Brown | Jan. 1, 1889 |
| 550,345 | Humphreys et al. | Nov. 26, 1895 |
| 1,026,681 | Klein | May 21, 1912 |
| 1,048,977 | Larkin | Dec. 31, 1912 |
| 1,729,389 | Hughett | Sept. 24, 1929 |
| 1,887,771 | Marsh | Nov. 15, 1932 |